United States Patent
Butler et al.

(10) Patent No.: US 8,386,520 B2
(45) Date of Patent: Feb. 26, 2013

(54) DATABASE SECURITY STRUCTURE

(75) Inventors: Mark Henry Butler, Bristol (GB); David Murray Banks, Bristol (GB); John S. Erickson, Norwich, VT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2207 days.

(21) Appl. No.: 11/096,576

(22) Filed: Mar. 30, 2005

(65) Prior Publication Data

US 2006/0230042 A1    Oct. 12, 2006

(51) Int. Cl.
*G06F 7/00* (2006.01)
*G06F 17/30* (2006.01)

(52) U.S. Cl. ......... 707/785; 707/781; 707/783; 707/784

(58) Field of Classification Search ........................ None
See application file for complete search history.

(56) References Cited

U.S. PATENT DOCUMENTS

| | | | | |
|---|---|---|---|---|
| 5,787,430 | A | * | 7/1998 | Doeringer et al. ............ 707/100 |
| 6,005,571 | A | * | 12/1999 | Pachauri ......................... 707/10 |
| 2003/0115322 | A1 | * | 6/2003 | Moriconi et al. ............. 709/224 |
| 2005/0038790 | A1 | * | 2/2005 | Wolthusen ..................... 707/100 |

OTHER PUBLICATIONS

Dyreson, C.E., et al., "Capturing and Querying Multiple Aspects of Semistructured Data," *Proceedings of the 25th VLDB Conference*, Edinburgh, Scotland, 12 pages total (1999).
Wang, J., et al., "A Role-Based Approach to Access Control for XML Databases," *Presented at SACMAT'04*, Yorktown Heights, NY, pp. 70-77 (Jun. 2-4, 2004).

* cited by examiner

*Primary Examiner* — Fred I Ehichioya
*Assistant Examiner* — Jau-Shya Meng (57) ABSTRACT

A database structure that may be used for semistructured databases assigns each node of a database to a collection. For each collection, create rights, retrieve rights, associate rights and dissassociate rights are provided to one or more users, the rights being assigned in common for all nodes of the collection. Users can only carry out the task if they have the appropriate rights. In this way, a flexible database security structure is provided that can deliver appropriate security for different elements of a semistructured database.

11 Claims, 3 Drawing Sheets

Fig. 1

|        | Collection 1 | | Collection 2 | |
|--------|----------|-----------|----------|-----------|
|        | Retrieve | Associate | Retrieve | Associate |
| USER 1 | Yes | Yes | No  | No  |
| USER 2 | Yes | No  | Yes | No  |
| USER 3 | No  | No  | Yes | Yes |
| ....   |     |     |     |     |
| ...    |     |     |     |     |

| | Collection 1 | | | |
|---|---|---|---|---|
| | Retrieve | Associate | Create | Delete |
| Owner | Yes | Yes | Yes | Yes |
| Colleague | Yes | Yes | No | No |
| User | Yes | No | No | No |
| .... | | | | |
| ... | | | | |

Fig. 6

DATABASE SECURITY STRUCTURE

FIELD OF INVENTION

The invention relates to a method, apparatus and computer program product for providing security in a database environment, particularly but not exclusively in a semistructured or triple oriented data store.

RELATED ART

Most modern databases are relational databases. Such databases are made up of tables joined by relations. Normally, each row in a table describes another instance of a similar object. Accordingly, the rows have similar sets of properties. Security policies may be assigned to data in such databases by assigning security policies to tables, or parts of the tables.

However, in some situations it is desired to describe collections of dissimilar objects, and accordingly with dissimilar properties. Collections of disparate data are not efficiently stored in a relational database structure, and so there is interest in so-called "semistructured" databases such as digital object repositories that have a structure more appropriate for describing such collections.

A limited amount of work has been done on security aspects of such semistructured databases.

One such approach is described in "Capturing and Querying Multiple Aspects of Semistructured Data", Dryeson et al, proceedings of the 25th VLDB Conference, Edinburgh, 1999. In the approach of Dryeson et al, information is stored in nodes that are linked with pointers. Security settings can be assigned to individual edges (i.e. pointers between nodes), and an edge can be traversed only by users with appropriate security. However, the approach of Dryeson et al does not do anything to stop users creating additional edges, without such security requirements, thereby allowing the user to access additional data. The approach of Dryeson et al is therefore only suitable in environments where users cannot create their own data or add to the database, and the database is centrally controlled, for example by a commercial information supplier. Role based access control has been suggested for XML databases in Wang and Osborn, "A role-based approach to access control for XML databases" presented at SACMAT04, Jun. 2-4, 2004, Yorktown Heights, N.Y., USA. In this approach, specific roles are granted specific rights with respect to specific labelled fields of XML data.

There is accordingly a need for a relatively flexible approach to deliver security, for example access control. There is a particular need for an approach suitable for databases that are less structured than conventional relational databases.

SUMMARY OF INVENTION

According to the invention there is provided:
a security method for a database having a plurality of nodes each node having at least one property, and a plurality of users, the method comprising:
  defining a plurality of collections, each collection being a collection of nodes,
  assigning each of a plurality of nodes to at least one collection;
  assigning for each collection create rights, retrieve rights, associate to, associate from and dissassociate rights to one or more users, the rights being assigned in common for all nodes of each collection;
  allowing a user to create a node in a collection if and only if the user has create rights for that collection;
  allowing a user to retrieve data in a node if and only if the user has retrieve rights for at least one collection containing the node;
  allowing a user to associate a node with a collection if and only if he has associate to rights for that collection and associate from rights for a collection containing the node; and
  allowing a user to disassociate a node with a collection if and only if he has disassociate rights for that collection.

The invention also relates to a corresponding database system and to a computer program product.

BRIEF DESCRIPTION OF DRAWING

For a better understanding of the invention, embodiments will be described, purely by way of example, with reference to the accompanying drawings, in which.

Like or corresponding elements are given like reference numerals in different figures.

DETAILED DESCRIPTION

Figure 1:
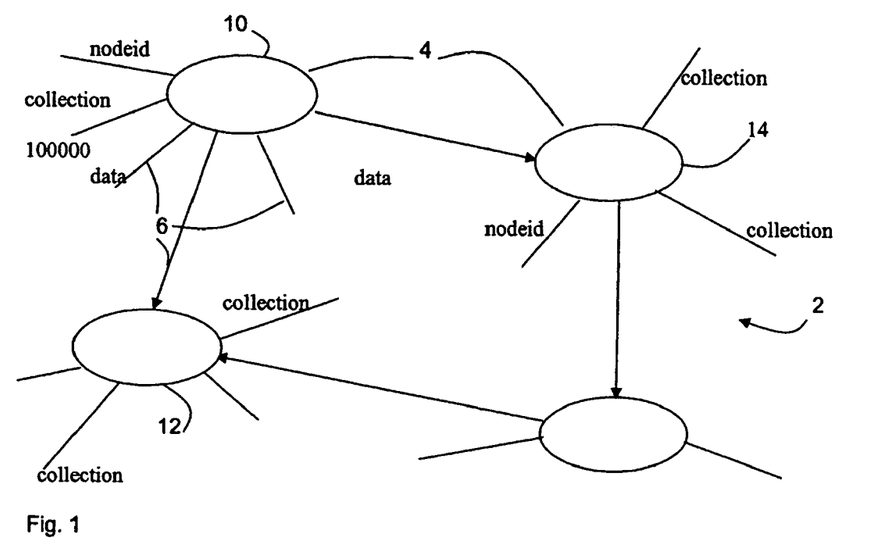
FIG. 1 shows a schematic diagram of a database implementing an embodiment of the invention.

Referring to FIG. 1, a database 2 includes a plurality of nodes 4, each with a plurality of properties 6 represented by lines extending from the node. Some properties are pointers to other nodes, represented by arrows in FIG. 1, and some may contain literal values or pointers to data resources such as an image file. Each property is assigned a label; for clarity, only some of the properties are labelled and/or provided with reference numerals in FIG. 1.

While graphs of the form of FIG. 1 conveniently show the tree structure of data, such data may also be represented in other ways more convenient for storing in a computer.

Thus, for the node 10 at the top left in FIG. 1, the data may be represented by a table of properties and values:

TABLE 1

| Property | Value |
| --- | --- |
| nodeid | 10 |
| collection | 100000 |
| collection | 100010 |
| child node | 12 |
| child node | 14 |
| data | literal_data |
| data | pointer_to_data |

The node id may be a unique identifier for the node, containing in this example the value 10. This could also be a URI, a URL, a handle, a URN, or a PURL, or indeed any identifier of the node.

Nodes are grouped into collections of nodes. Each node may be in one or more collections of nodes. In the embodiment, nodes are assigned to collections using a single collection property of the node. Table 1 shows that node 10 belongs to the root collection given an arbitrary value 100000 as well as another collection labeled 100010 which is an arbitrary label of another collection collection to which the node belongs. Alternatively, instead of storing the collection in the individual nodes the collection may be stored as a node including pointers to each node of the collection.

One collection is a root collection to which all nodes belong. Some nodes may belong only to the root collection.

The node 10 has two pieces of data associated directly with it, one being a piece of literal data and one being a pointer to a data resource elsewhere.

The node 10 also has two child nodes, with node ids of 12 and 14, indicated in FIG. 1 with reference numerals 12 and 14.

In the example of FIG. 1, both child nodes 12, 14 are members of more than one collection and accordingly have more than one "collection" property.

Table 1 shows the data only for one node. In order to represent the whole database, the database may be represented by data triples, in the form (node_id, property, value).

The collections are used to control all access to the data contained in the database. Users are assigned rights to a collection, and each user may be assigned retrieve, update, associate and disassociate rights to nodes within a collection. Users may only carry out the action if they have the required right. Thus, users may only create, delete and update nodes of a collection if they have update rights, users may only retrieve data from nodes of a collection if they have retrieve rights, and users may only associate nodes to a collection or disassociate nodes from a collection if they have appropriate rights.

Figure 2:
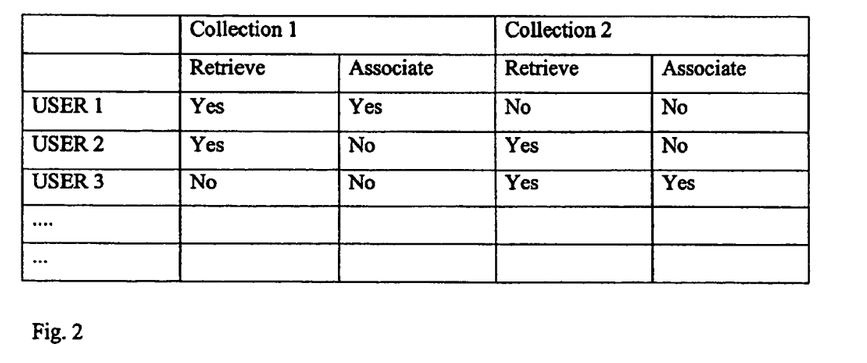
FIG. 2 shows a data table of the embodiment of FIG. 1.

In the first embodiment, the rights of a user with regard to a collection are simply stored in a table, which may be represented as in FIG. 2 as a list of users cross referenced to the rights of each user with respect to each collection. For simplicity, only two collections and two rights are shown in FIG. 2 though in practice the system can deal with many more. The skilled person will realise that there are alternative ways of storing the same information, and the use of a table is not required.

In the example, user 1 can retrieve data of the nodes of collection 1 and also associate new nodes with this collection, but has no access to collection 2. User 3 can retrieve the nodes of collection 2 and also associate new nodes with that collection, but has no access to collection 1. User 2 can retrieve data from both collections 1 and 2, but has no ability to associate new nodes to either of the collections.

In use, users with appropriate access can add new nodes, update nodes, and move nodes between collections. This can be done at the level of individual nodes simply by adding or changing the collection property of a node. Thus, the protections can be changed dynamically.

Surprisingly, this apparently limited and simple model can implement a variety of security models as required. Thus, it is able to deliver a flexible security policy that can be adapted to different data and different types of data contained in a single semistructured database or in different databases.

For example, the invention can deliver mandatory access control by assigning only to an administrator user associate and disassociate rights, and carefully controlling the create rights of users so that they cannot retrieve a resource and create it in an alternative collection.

Alternatively, the same structure can deliver discretionary access control by allowing users to associate and disassociate nodes with collections by providing such rights to users.

A further detail of the first embodiment is that system administrators have access to the root collection. This ensures that the system can be correctly administered.

Figure 3:
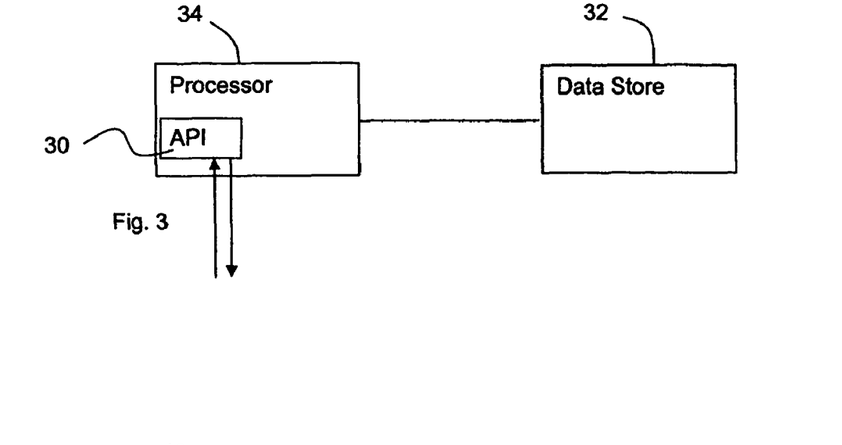
FIG. 3 shows apparatus implementing the embodiment of FIG. 1.
Figure 4:
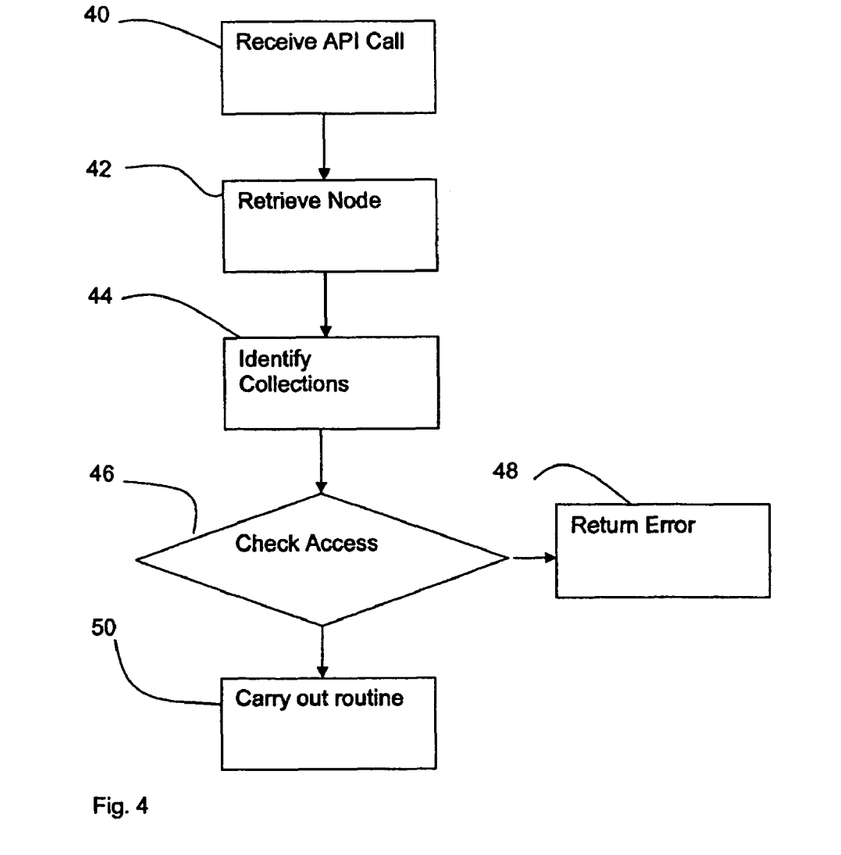
FIG. 4 shows a flow diagram of a method of the embodiment of FIG. 1.
Figure 5:
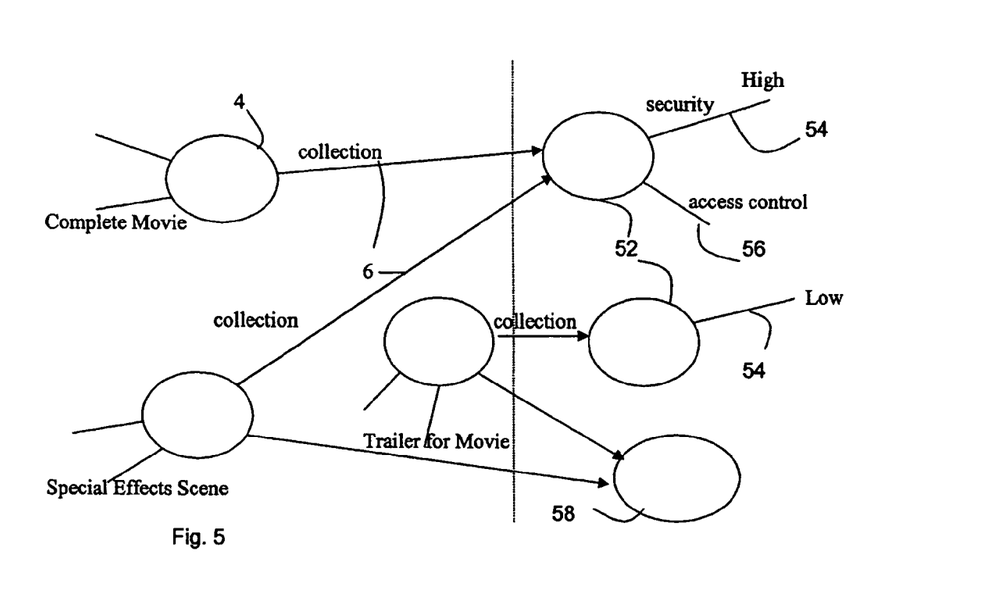
FIG. 5 illustrates an application of the embodiment of FIG. 1.

A second embodiment of the invention will now be described. FIGS. 3 and 4 illustrate a system and a method of the second embodiment, and FIG. 5 shows an application of the embodiment.

The system includes a data store 32, which may include many individual data stores networked together, and a processor 34 including code implementing an application programming interface (API) 30. Users access the data by calling the API and receiving return messages as shown schematically by the arrows in FIG. 3.

A user accesses the data or attempts to add, delete, update or remove a node by calling the API 30, the call specifying the node or nodes required and the required operation. The API 30 receives 40 this call, then retrieves 42 the node from the data store 32, identifies 44 the collections which contain the node checks 46 that the user has suitable rights to at least one of the collections containing the node. If the user has insufficient access, the API 30 returns 48 an error message indicating this; otherwise the API carries out 50 the requested action.

In this embodiment, the collections are themselves stored in the database of the data store 32. Thus, in this embodiment, the collection data themselves are nodes and so the "collection" properties of the nodes 4 may be represented as pointer properties 6, as has been done in FIG. 5.

The collection properties of the node are an indexed field, so all nodes having particular values of the collection property are collected together in the index. This enables all nodes of the collection to be found using the index if this is required.

Secondly, a slightly extended list of permissions is granted. In this embodiment, the API 30 allows the following calls to determine if a node in a collection may be processed by a user:
NewNode(collection);
UpdateNode(collection)
RetrieveNode(collection);
AssociateTo(collection);
AssociateFrom(collection);
DisassociateNode(Collection); and
DeleteNode(collection)

These calls return a value that indicates if a particular user can carry out the New, Update, Retrieve, Associate, Disassociate or Delete operations respectively.

Note that the Update permission of the first embodiment has been replaced with New, Update and Delete permissions.

Also, the Associate and Disassociate node operations now have two arguments. The toCollection or fromCollection field is the collection to or from which the node is to be associated or disassociated, and the IsInCollection field is the collection in which the node is presently. Note that the user must have both rights, in this embodiment, to add a node to a collection, i.e., the node must be in a collection to which the user has IsInCollection rights and must be added to or taken from a collection to which the user has toCollection or fromCollection rights respectively. Examples of the use of these fields will be presented below.

Thus, for any collection a user may have any or all of seven different rights:
CanCreateNewNode;
CanUpdateNode;
CanRetrieveNode;
CanDeleteNode;
CanAssociateNodeFromCollection;
CanAssociateNodeToCollection; and
CanDisassociateNodeFromCollection.

A user can associate a node with a collection only if he has CanAssociateNodeFromCollection rights to a collection containing the node and CanAssociateNodeToCollection rights to the collection to which the node is to be associated.

A user can disassociate a node from a collection only if he has CanDisassociateNodeFromCollection rights to the collection containing the node.

The approach can deliver a variety of functionalities all from this simple arrangement.

The security policy is defined using collections of nodes where each node can be a member of more that one set. The system according to the embodiment therefore offers a semi-structured database with a fine level of granularity of security policy. Conventionally, semistructured databases have not operated with such fine control of security.

Note that unlike conventional relational database models, nodes can be transferred between collections in real time, i.e. dynamically, by users having suitable associate and dissassociate rights.

A different approach is described in "Capturing and Querying Multiple Aspects of Semistructured Data", Dryeson et al, proceedings of the 25th VLDB Conference, Edinburgh, 1999. In the approach of Dryeson et al, security settings can be assigned to individual edges (i.e. pointers between nodes), and an edge can be traversed only by users with appropriate security. However, the approach of Dryeson et al does not do anything to stop users creating additional edges, without such security requirements, thereby allowing the user to access additional data. The approach of Dryeson et al is therefore only suitable in environments where users cannot create their own data or add to the database, and the database is centrally controlled for example by a commercial information supplier.

In contrast, the approach presented in the present embodiment provides security even in those semistructured databases where the users have access to create their own data. The nodes added by a user may be added to a collection for which the user has extensive rights without allowing data affixed to other nodes to be accessed.

An application of the second embodiment will now be described with reference to FIG. 5.

The system as set out above can be used to implement a variety of different policy types, even within a single database.

In an example, the API and database structure is used in a repository for media objects, including movies, soundtracks, music and the like. In this approach, a number of different security levels are assigned to the data objects, in the example "high", "medium" and "low". For example, a "high" security level may be assigned to nodes including the data of complete movies before their release, to minimise the risk of unauthorised access and copying. A "medium" security level may be assigned to copyright material for which the studio wishes to maintain control, and a "low" security level may be assigned to publicly available material such as trailers.

It may be assumed that the information is being stored by a company that deals with many movies and movie studios, and so the data will be owned by many different parties. The example might therefore represent a special effects house hired by different movie studios to produce special effects. The data stored on the nodes may be the complete movie, the sound track or simply scenes.

High security is appropriate for unreleased movies. These may be grouped in collections with a high security level and limited access.

Such high security is not necessary for other data items, that may be stored in the same database, and which relate to low security items such as trailers or advertising for films already released. The nodes 4 containing such data may be assigned to collections having a low security policy and in which many more users have access to the data, and the ability to change it. Such nodes may effectively have "owners" and the owners may have the ability to move and store the nodes as they wish.

In this application, each node 4 is assigned to at least one security collection, defined by a security collection node 52, and one of the properties of the collection node is the security level 54. Only a limited number of administrator users are assigned the ability to amend these collection nodes 52, which is achieved by ensuring that the collection nodes 52 are themselves part of a collection with limited access. The security policies defined for the "high" security collection nodes include very little access for anybody who is not highly trusted, thereby effectively implementing a mandatory access control for the high security data. In other words, CanAssociateNodeToCollection and CanDisassociateNodeFromCollection rights for some collection nodes are very limited. Indeed, these may only be accessible to system administrators. This is particularly appropriate for "high security" collection nodes.

Note in this example application that a further feature of the example provides security even though multiple companies can all access the data store. Users are divided into two types of users—clients and staff.

Each client has a respective collection 58 of nodes, the nodes of that client. Clients have create, retrieve and update rights for the nodes of that client. Clients have also associate and disassociate rights for these nodes to allow them to associate their own nodes with different security levels. Thus, clients have CanAssociateNodeFrom and CanDisassociateNodeFrom rights for the nodes in their collection, to allow them to control the security rights for these nodes. They also need CanAssociateNodeTo and CanDisassociateNodeFrom rights to the security collections. However, they do not have CanAssociateNodeTo or CanDisassociateNodeFrom rights for the collection of their own nodes, so they cannot accidentally disassociate their own nodes or associate them to other clients. A limited number of system administrators are given these rights.

Each individual staff member has a respective collection of nodes to which they have access. An internal staff administrator has CanAssociateNodeTo and CanDisassociateNodeFrom rights to these collections so that nodes can be assigned to staff members to allow them to work with them. However, they do not have rights to change the security levels of these nodes or to move them from one client to another. This is achieved by not providing CanAssociateNodeTo and CanDisassociateNodeFrom rights to these staff members to the collections of high security nodes.

It is possible to provide for users who can switch nodes between clients, for example by assigning them suitable rights of the low and medium security level collections. By not allowing this for the high level security, client companies can ensure that rights for high security items cannot be assigned to third parties without their permission.

Thus, the single API and database structure may effectively mix different types of data security within a common semistructured database using a single common approach to defining the security policies.

The same embodiment can be used to provide mandatory access control in another application.

Each user has a collection. In this application, all users only have create rights to nodes in their own collection. Only system administrators have any associate or disassociate rights—this is achieved by having a collection of nodes including all relevant nodes and allowing system administrators all association and disassociation rights for these nodes.

The embodiment can also be used to provide a multiple level access control in a different application. As in the application discussed above, nodes are assigned to security levels. Each level is represented by a collection, and different users are assigned retrieve, create and update rights to the collections of the respective security levels. For security, only system administrators can lower security levels.

To deliver discretionary access control, each user may have a collection, and can associate and disassociate nodes in their collection. Users cannot disassociate nodes from their own collection, or associate nodes from anyone else's collection. This can be achieved using only CanAssociateNodeFrom access types, so that users can associate nodes in their own collection with collections of other users to give those other users equal rights to the associated nodes, if they wish.

Thus, the second embodiment provides a flexible security system that may be used to specify a wide variety of very different security policies.

The approach may be used many areas from military security to business security.

Another application is, for example, in the field email repositories in which the email data is stored in nodes. To minimise storage, each attachment may be stored once and be part of several collections, one belonging to the sender of the email, one to the recipient, and further collections as required to allow auditing and checking of email correspondence.

In a third embodiment, the access of users to collections is determined using roles. For each collection, a set of roles, each role defining a set of rights for that collection, and rights for a collection are assigned to a user by assigning the user to at least one of the roles for that collection.

Figure 6:
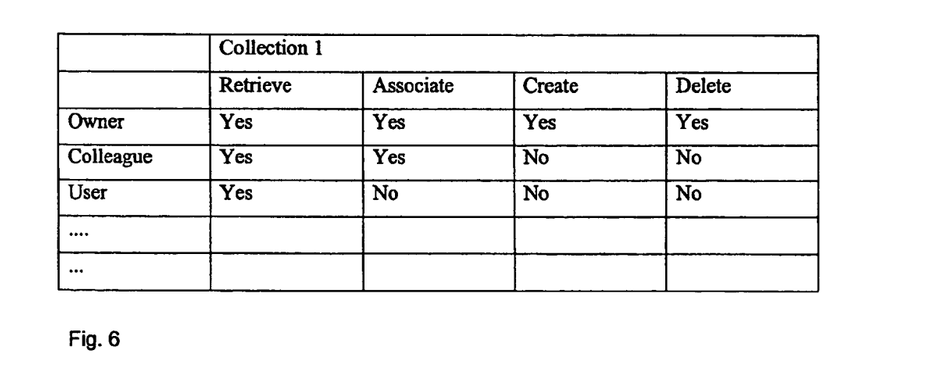
FIG. 6 shows a data table of a further embodiment of the invention.

The table of FIG. 6 shows an "owner" role for collection 1, which has all rights for that collection, a "user" role that can only retrieve data, and a "colleague" role that can add nodes to the collection but that cannot delete nodes or disassociate them from a collection.

The "colleague" role may be used in the second embodiment to allow nodes to be transferred from an originating collection to a destination collection by the owner of the originating collection with "colleague" rights to the destination collection. In this way, the colleague role as part of a discretionary access control where individuals are considered to own their own data and allow access to other users as they wish.

By assigning users to roles a convenient set of rights may be defined for users without needing to define separately associate, create, disassociate, delete, update and retrieve rights. For example, an "owner" role may have all rights and a "reviewer" role may have retrieve rights only.

Role based access control has been suggested for XML databases in Wang and Osborn, "A role-based approach to access control for XML databases" presented at SAC-MAT'04, Jun. 2-4, 2004, Yorktown Heights, N.Y., USA. In this approach, specific roles are granted specific rights with respect to specific labelled fields of XML data. In this approach, however, the roles are not assigned as specific accesses to collections of nodes.

In contrast, by assigning access on the basis of collections of nodes, not on specific XML fields, the embodiment described allows access to be finely divided on a node-by-node basis. Since collections of nodes may be grouped into collections as required this may be on the basis of the real links between data. Therefore, the embodiment provides a useful fine grained access control without requiring specific access for individual fields. The Wang and Osborn approach is more suitable for centralised standard databases in which the data is of similar type across the database, unlike the method used in this embodiment which allows for semistructured and relatively heterogenous collections of data.

It will be appreciated that the role-based approach can easily be used in the all embodiments, examples and applciations above. For example, in the "movie" example above, roles can be created for "owning studio", "graphic artist", and "movie critic", and very different access rights provided for these. The graphic artist may have the right, for example, to create new data for existing data nodes, but not to move data or nodes around and so may have no "associate" or "disassociate" rights.

In another example, the database includes:
a collection called salaries which relates to salary information, with a permission called inspectSalaries that allows users to read salary information and a permssion called updateSalaries that inherits from inspectsalaries but allows user to update salary information; and
a collection called employeeinformation that holds other employee information e.g. address, age, name, department etc., with a permission called employeeupdate that allows users to read and update employeeInformation and a permission called newEmployee that inherits employeeupdate and allows users to add salary information for new employees.

The users are grouped into:
a group of users called employees that have the employeeupdate permission.
a group of users called managers who inherit from employees and have the inspectSalaries permission;
a group of users called humanResources who inherit from employees and have the updateSalaries permission; and
a group of users called administrators who inherit from employees and have the newEmployee permission.

The skilled person will appreciate that the above embodiments and examples of databases using the embodiments are not limiting and that the invention may be implemented in a large variety of different environments and in different ways, on different platforms and in systems with a variety of different networking approaches.

For example, although many of the above embodiments are based on the concept that initially no user has permission to do anything without explicit permission, it is also possible to have the default position of everybody having permission to do everything, and then using the properties associated with collections to remove permissions.

In an example, in a project using a shared collection of documents, the default position may be that everybody in the project can create, read, update and delete the documents.

However, there may be some documents for which this general access is unsuitable, for example, a set of documents about the pay and conditions of contract employees. Access to these documents can be denied to everybody except the manager.

It may be desired to protect other documents from accidental deletion. For these documents, delete permission is denied to everybody except for the system administrator.

It will be seen that for some scenarios deleting access to specific documents will result in less work than giving permissions. The embodiments can work with either approach, or indeed a hybrid, as is convenient in any specific circumstances.

Also, although the examples above relate data nodes to collection nodes using properties of the data nodes, it is also possible to store this relationship by attaching pointers to all data nodes of a collection to the respective collection node.

We claim:

1. A security method for a database having a plurality of users and a plurality of nodes, each node having at least one property representing a property of the node, which may be data and/or being a pointer to another node, the method comprising:
defining a plurality of collections, each collection being a collection of said nodes;
assigning each of a plurality of said nodes to at least one collection;
assigning for each collection update rights, retrieve rights, associate rights and dissassociate rights to one or more users, the rights being assigned in common for all nodes of each collection;
updating, by at least one of said users, a given node in a given collection if and only if the at least one of said users has update rights for that given collection;
retrieving, by at least one of said users, data in another node if and only if the second mentioned at least one of said users has retrieve rights for at least one collection containing said another node;
associating, by at least one of said users, still another node with another collection if and only if the third mentioned at least one of said users has associate to rights for that another collection and associate from rights for a still another collection containing said still another node; and
disassociating, by at least one of said users, yet another node with yet another collection if and only if the forth mentioned at least one of said users has disassociate rights for that yet another collection.

2. The security method according to claim 1 further comprising defining for each collection a plurality of roles, each role having a set of rights for that collection; wherein assigning rights for a collection to a user includes assigning the user to at least one of the roles; and if a user is not assigned a role for a collection the user has no rights to that collection.

3. The security method according to claim 1 wherein each node is represented by a plurality of properties and values of the properties, wherein for each collection that a node is in one of the properties is a collection property having a value representing the collection.

4. The security method according to claim 1, wherein each collection is a represented by a collection node of the database and a node is assigned to the collection by adding a pointer to the collection node, the collection node itself being assigned to at least one collection.

5. The security method according to claim 4 in which the collection nodes includes security collection nodes representing the required level of security of the nodes in the collection.

6. A database system, comprising:
a processor and memory;
a plurality of nodes, each node having at least one property representing a property of the node;
a plurality of collections, each collection being a collection of nodes, each collection defining create rights, retrieve rights, associate to rights, associate from rights and dissassociate rights to one or more users, the rights being assigned in common for all nodes of the collection;
at least one data store storing the nodes and collections of the database;
an interface for accessing the data of the system, the interface including code, the code are executable, using the processor, to implement functions comprising:
updating, by a user, a node in a collection if and only if the user has update rights for that collection;
retrieving, by a user, data in a node if and only if the user has retrieve rights for at least one collection containing the node;
associating, by a user, a node with a collection if and only if he has associate to rights for that collection and associate from rights for a collection containing the node; and
disassociating, by a user, a node with a collection if and only if he has disassociate rights for that collection.

7. The database system according to claim 6 wherein the data store further includes: a definition for each collection of a plurality of roles, each role having a set of rights for that collection; and a definition of which roles which users have for which collections.

8. The database system according to claim 6 wherein the data store includes nodes representing each collection of the database, wherein nodes of the collection include a pointer to a collection node.

9. A computer program product stored on a non-transitory computer readable medium, the computer program product providing a database having a plurality of users and a plurality of nodes, each node having at least one property representing a property of the node, which may be data and/or being a pointer to another node, the computer program product including code, the code are executable, using a processor, to implement functions comprising:
defining a plurality of collections, each collection being a collection of nodes, to assign each of a plurality of nodes to at least one collection;
assigning for each collection update rights, retrieve rights, associate to rights, associate from rights and dissassociate rights to one or more users, the rights being assigned in common for all nodes of the collection;
updating, by a user, a node in a collection if and only if the user has update rights for that collection;
retrieving, by a user, data in a node if and only if the user has retrieve rights for at least one collection containing the node;
associating, by a user, a node with a collection if and only if the user has associate to rights for that collection and associate from rights for a collection containing the node; and
disassociating, by a user, a node with a collection if and only if the user has disassociate rights for that collection.

10. A database system, comprising:
a processor and memory;
a plurality of nodes, each node having at least one property representing a property of the node;
a plurality of collections, each collection being a collection of nodes, each collection defining create rights, retrieve rights, associate to rights, associate from rights and dissassociate rights to one or more users, the rights being assigned in common for all nodes of the collection;
at least one data store storing the nodes and collections of the database;
an interface for accessing the data of the system, the interface including:
a means for updating, by a user, a node in a collection if and only if the user has update rights for that collection;
a means for retrieving, by a user, data in a node if and only if the user has retrieve rights for at least one collection containing the node;
a means for associating, by a user, a node with a collection if and only if the user has associate to rights for that collection and associate from rights for a collection containing the node; and a means for disassociating, by a user, a node with a collection if and only if the user has disassociate rights for that collection.

11. A security method for a database having a plurality of users and a plurality of nodes, each node having at least one property representing a property of the node, which may be data and/or being a pointer to another node, the method comprising:

storing at least one role for each of a plurality of collections of nodes, the roles setting out rights for that collection;

assigning rights for a collection to a user by assigning the user to at least one of the roles in common for all nodes of the collection;

updating, by a user, a node in a collection if and only if the user has update rights for that collection;

retrieving, by a user, data in a node if and only if the user has retrieve rights for at least one collection containing the node;

associating, by a user, a node with a collection if and only if the user has associate to rights for that collection and associate from rights for a collection containing the node; and disassociating, by a user, a node with a collection if and only if the user has disassociate rights for that collection.

* * * * *

UNITED STATES PATENT AND TRADEMARK OFFICE
CERTIFICATE OF CORRECTION

| | |
|---|---|
| PATENT NO. | : 8,386,520 B2 |
| APPLICATION NO. | : 11/096576 |
| DATED | : February 26, 2013 |
| INVENTOR(S) | : Mark Henry Butler et al. |

It is certified that error appears in the above-identified patent and that said Letters Patent is hereby corrected as shown below:

In the Claims:

In column 9, line 12, in Claim 1, delete "dissassociate" and insert -- disassociate --, therefor.

In column 9, line 45, in Claim 4, delete "is a" and insert -- is --, therefor.

In column 9, lines 58-59, in Claim 6, delete "dissassociate" and insert -- disassociate --, therefor.

In column 10, lines 31-32, in Claim 9, delete "dissassociate" and insert -- disassociate --, therefor.

In column 10, lines 51-52, in Claim 10, delete "dissassociate" and insert -- disassociate --, therefor.

Signed and Sealed this
Fourth Day of June, 2013

Teresa Stanek Rea
*Acting Director of the United States Patent and Trademark Office*